(12) United States Patent
Baba et al.

(10) Patent No.: US 6,369,831 B1
(45) Date of Patent: Apr. 9, 2002

(54) PICTURE DATA GENERATING METHOD AND APPARATUS

(75) Inventors: Shigeyuki Baba; Akira Shirakura, both of Tokyo; Nobuhiro Kihara, Kanagawa; Osamu Akimoto, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/234,943

(22) Filed: Jan. 21, 1999

(30) Foreign Application Priority Data

Jan. 22, 1998 (JP) .......................................... 10-010767

(51) Int. Cl.[7] .............................................. G06T 11/60
(52) U.S. Cl. ..................................................... 345/635
(58) Field of Search ................................ 345/419, 427, 345/433, 438, 139, 629, 635, 647, 672, 619; 382/312, 154; 348/40, 42

(56) References Cited

U.S. PATENT DOCUMENTS 4,964,684 A * 10/1990 Iovine .......................... 359/23
5,703,961 A * 12/1997 Rogina et al. ............... 382/154
5,751,927 A * 5/1998 Wason .......................... 345/419
6,108,440 A * 8/2000 Baba et al. ................... 382/154

FOREIGN PATENT DOCUMENTS

EP          0 816 951          1/1998

* cited by examiner

*Primary Examiner*—Matthew Luu
*Assistant Examiner*—Chante' Harrison
(74) *Attorney, Agent, or Firm*—Frommer Lawrence & Haug LLP; William S. Frommer; Darren M. Simon

(57) ABSTRACT

An image data generating method and apparatus in which, when performing viewing point conversion processing on data of strings of parallax images each made up of plural images containing the parallax information, data of a new string of parallax images can be generated promptly. To this end, a lookup table showing the relation of correspondence between pixels of respective images making up an original string of parallax images and pixels of respective images of a new string of parallax images is prepared at the outset and stored in a lookup table memory 72. The pixel interchanging is effectuated, based on the lookup table, in order to effectuate viewing point conversion processing, to generate the data of the new string of parallax images.

12 Claims, 16 Drawing Sheets

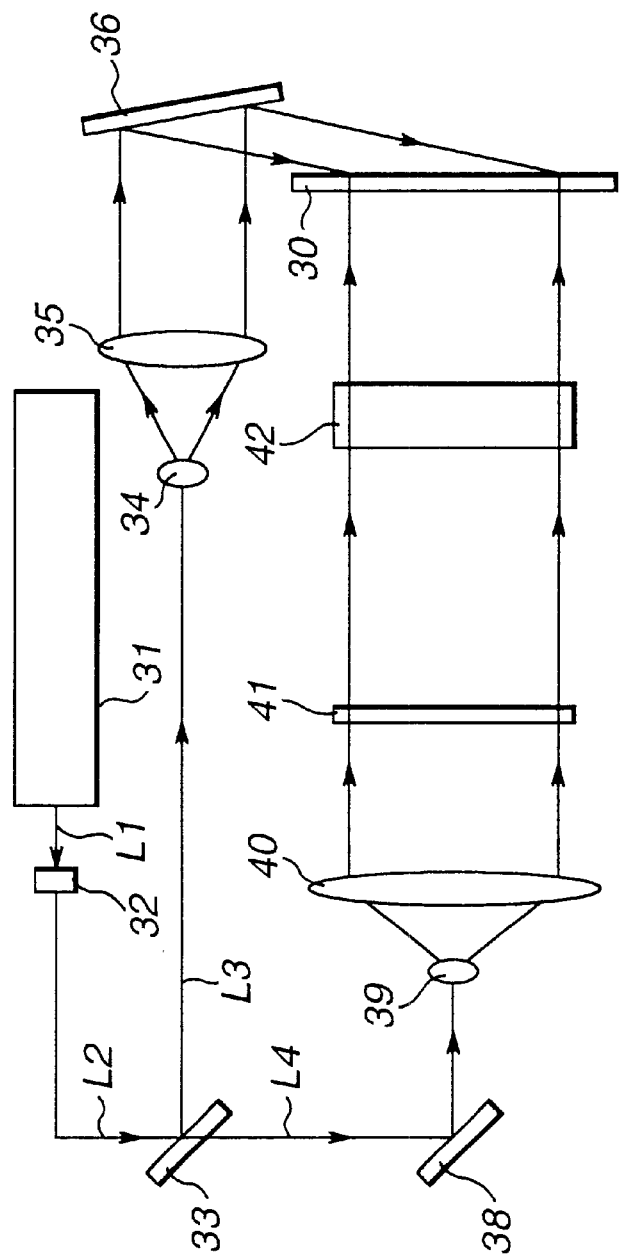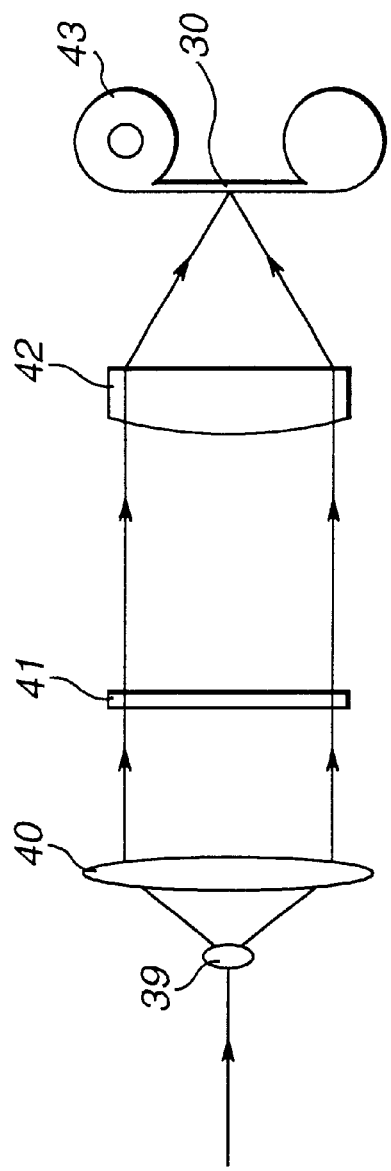
FIG.6A
FIG.6B

| frame$_{org}$ | line |
|---|---|
| 1 | 1 |
| 2 | 1 |
| . | . |
| . | . |
| . | . |
| 480 | 1 |
| 2 | 2 |
| 3 | 2 |
| . | . |
| . | . |
| . | . |
| 481 | 2 |
| 421 | 480 |
| 422 | 480 |
| . | . |
| . | . |
| . | . |
| 900 | 480 | frame$_{new}$1 = rows 1–480 (first block)
frame$_{new}$2 = rows 2–481 (second block)
frame$_{new}$421 = rows 421–900 (last block)

FIG.14

PICTURE DATA GENERATING METHOD AND APPARATUS

BACKGROUND OF THE INVENTION

1. Field of the Invention

This invention relates to a picture data generating method and apparatus for processing data of a string of parallax images composed of plural pictures containing the parallax information with parallax conversion to generate data of a new string of parallax images.

2. Description of the Related Art

A holographic stereogram is prepared by sequentially recording a large number of pictures, as original image, obtained on sequentially imaging an object from plural viewing points, on a sole recording medium for hologram as strip-shaped or dot-shaped elementary holograms.

For producing a holographic stereogram having the parallax information only in the horizontal direction, an object 100 is imaged sequentially from different viewing points in the horizontal direction to produce a string of parallax images 101 which is made up of plural images 102 having the parallax information in the horizontal direction. The images 102 making up this string of parallax images 101 are sequentially recorded as strip-shaped elementary holograms on a hologram recording medium 103 so that the images will be contiguous to one another in the horizontal direction. This gives a holographic stereogram having the parallax information in the horizontal direction.

With this holographic stereogram, the information of plural images 102, obtained on sequentially imaging from different viewing points arrayed in the horizontal direction, is sequentially recorded as strip-shaped elementary holograms in a horizontally contiguous row of images. Thus, if a viewer observes the holographic stereogram with both eyes, the two-dimensional pictures as seen by the left and right eyes differ slightly from each other because of the slight difference in the positions of the left and right eyes in the horizontal direction. Thus, the viewer feels the parallax, with the reproduced picture being recognized as a three-dimensional picture.

The string of parallax images, from which the holographic stereogram is produced, is obtained on horizontally translating a camera 104, oriented towards the object 100, with its orientation being kept unchanged, and imaging the object 100 a number of times from different positions. That is, the camera 104, oriented towards the object 100, is translated, from a position in which the object 100 begins to be captured by the camera 104 up to a position in which the object 100 ceases to be captured by the camera 104, and a number of images are shot during this time interval, whereby the string of parallax images, form which the holographic stereogram is derived, is obtained. Meanwhile, this system of translating the camera 104, with the orientation of the camera 104 remaining fixed, and imaging the object 100 a number of times from different positions, is termed a straight track system.

It is noted that, in the holographic stereogram, the relative position between the viewing point of the camera 104 and the object 100 during imaging is kept in the reproduced images of the produced holographic stereogram. Thus, if the string of the parallax images, produced as described above, is directly used for preparation of the holographic stereogram, a reproduced image Z is formed at a recessed position as from a hologram surface Ha of a holographic stereogram 100, as shown in FIG. 3. Thus, in such holographic stereogram H, the reproduced image Z is distorted or blurred, unless the reproduced image is viewed with the viewing point S set on the hologram surface Ha, so that a distance $d_o$ between the reproduced image Z and the viewing point S of the viewer coincides with a distance d between the object 100 being imaged and the viewing point of the camera 104.

Therefore, if, in producing the holographic stereogram, the above-mentioned problem is to be solved, it is necessary to process data of the original string of parallax images with viewing point conversion so that the reproduced image Z will be imaged in the vicinity of the hologram surface Ha of the holographic stereogram 100. By this viewing point conversion processing, the reproduced image Z free of distortion or blurring can be produced even if the viewing point S is spaced apart from the hologram surface Ha.

In preparing the holographic stereogram, it is necessary to execute the above-described viewing point conversion processing, which, however, requires a complex arithmetic operations. For this reason, preparation of the holographic stereogram is time-consuming. That is, the operation of processing the data of the string of the parallax images with viewing point conversion to produce new data of the string of the parallax images is time-consuming such that a holographic stereogram cannot be prepared promptly.

However, if the holographic stereogram producing system is to be practically used as a printer device for outputting a hard copy from which a three-dimensional image can be prepared, the time as from the inputting of images as a source of the holographic stereogram until completion of the holographic stereogram needs to be shortened. That is, expedited viewing point conversion processing is desired strongly.

The viewing point conversion processing is desired to be expedited in other processes than the above-described process for preparing the holographic stereogram. For example, there are occasions wherein the viewing point conversion processing is carried out for displaying a stereoscopic image on a display device by exploiting the parallax. It goes without saying that, in such case, the viewing point conversion processing is desirably carried out expeditiously.

SUMMARY OF THE INVENTION

It is therefore an object of the present invention to provide an image data generating method and apparatus whereby, in processing data of the parallax image string made up of plural images carrying the parallax information with viewing point conversion processing to generate data of a new parallax image string, these data of the new parallax image string can be generated expeditiously.

In one aspect, the present invention provides an image data generating apparatus in which viewing point conversion processing is performed on data of a first string of parallax images made up of plural images containing the parallax information to generate data of a second string of parallax images. The apparatus includes lookup table storage means for storing a lookup table giving the relation of correspondence between pixels of a first string of parallax images and those of a second string of parallax images. The data of the second string of parallax images from data of the first string of parallax images are generated by performing the viewing point conversion processing by pixel interchanging based on the lookup table stored in the lookup table storage means.

In the viewing point conversion processing general, the relation of correspondence between pixels of a first string of parallax images and those of a second string of parallax images is constant at all times if the parameters for the viewing point conversion processing are constant. Therefore, if the relation of correspondence is previously known, the viewing point conversion processing may be realized simply by pixel interchanging which is based on the above relation of correspondence.

In the image data generating apparatus, the viewing point conversion processing can be realized promptly without the necessity of executing complex arithmetic processing operations.

The image data generating apparatus preferably includes image data storage means for storing data of a string of parallax images. When generating data of the second string of parallax images, data of respective images making up the string of parallax images are sequentially stored in the image data storage means, and the viewing point conversion processing is effectuated after storing the entire data of the string of parallax images into the image data storage means. This renders it possible to input the string of parallax images to the apparatus in real-time each time an image of the string of parallax images is shot.

The image data generating apparatus preferably includes lookup table generating means for generating the lookup table by finding the relation of correspondence between pixels of the original string of parallax images and those of a new string of parallax images.

In the image data generating apparatus, preferably the lookup table storage means is of an overwrite type and is adapted to rewrite the contents of the lookup table responsive to the desired viewing point conversion processing since this enables a variety of types of the viewing point conversion processing with different parameters to be coped with.

If, in the image data generating apparatus, the string of parallax images has parallax only in one direction, preferably the relation of correspondence between pixels of the images making up the string of parallax images and those making up the new string of parallax images is recorded in the lookup table, with a pixel line made up of a line of plural pixels as a minimum unit. When carrying out the viewing point conversion processing, pixel interchanging is effectuated with the pixel line as a minimum unit.

If the pixels are interchanged with the pixel line as a minimum unit, the pixel line corresponds to a scanning line for displaying the image on a display device. If the string of parallax images has parallax only in the scanning line direction, the viewing point conversion processing is effectuated on rotating the images making up the string of parallax images by 90°.

If, in the above image data processing apparatus, keystone distortion is produced in the original string of parallax images, correction parameters for correcting the keystone distortion are preferably contained in the lookup table in addition to the it relation of correspondence between pixels of the images making up the string of parallax images and those making up the new string of parallax images. When effectuating the viewing point conversion processing, pixel interchanging is effectuated based on the lookup table, while the keystone distortion is corrected based on the correction parameters.

In the above image data processing apparatus, the data of a newly generated string of parallax images is data of a string of parallax images recorded on a holographic stereogram, and the images making up the string of parallax images is recorded as elementary holograms making up the holographic stereogram.

If data of a string of parallax images newly generated by the image data generating apparatus are data of a string of parallax images to be recorded on a holographic stereogram, data of the string of parallax images subjected to viewing point conversion processing is sequentially outputted in a timed relation to the recording of each elementary hologram in terms of an image of the string of parallax images as a unit. This enables the holographic stereogram to be prepared promptly.

In another aspect, the present invention provides an image data processing method in which viewing point conversion processing is performed on data of a the string of parallax images made up of plural images containing the parallax information to generate data of a new string of parallax images. The image data processing method includes producing a lookup table giving the relation of correspondence between pixels of a the string of parallax images and those of the new string of parallax images, and generating data of the new string of parallax images from data of the string of parallax images by performing the viewing point conversion processing by pixel interchanging based on the lookup table.

This renders it possible to execute the viewing point conversion processing expeditiously without requiring complex arithmetic operations.

In the image data processing method, when generating data of the new string of parallax images, data of respective images making up the string of parallax images are sequentially stored in image data storage means, and the viewing point conversion processing is effectuated after storing the entire data of the string of parallax images into the image data storage means. This renders it possible to input the string of parallax images to the apparatus in real-time each time an image of the string of parallax images is shot.

In the image data processing method, the lookup table is stored in an overwrite memory and, before proceeding to viewing point conversion processing, the contents of the lookup table are preferably rewritten responsive to the desired viewing point conversion processing, since this enables a variety of types of the viewing point conversion processing with different parameters to be coped with.

If the string of parallax images has parallax only in one direction, the relation of correspondence between pixels of the images making up the string of parallax images and those making up the new string of parallax images is preferably recorded in the lookup table with a pixel line made up of a line of plural pixels as a minimum unit. Also, when effectuating the viewing point conversion processing, pixel interchanging is effectuated with the pixel line as a minimum unit. This assures more efficient viewing point conversion processing.

In case of effectuating the pixel interchanging with the pixel line as a minimum unit, the pixel line preferably corresponds to a scanning line for displaying the image on a display device. If the string of parallax images has parallax only in the scanning line direction, the viewing point conversion processing is effectuated on rotating the images making up the string of parallax images by 90°.

If, in the image data processing method, there is produced keystone distortion in the original string of parallax images, correction parameters for correcting the keystone distortion are preferably contained in the lookup table in addition to the relation of correspondence between pixels of the images making up the string of parallax images and those making up the new string of parallax images. When effectuating the viewing point conversion processing, pixel interchanging is effectuated based on the lookup table, while the keystone distortion is corrected based on the correction parameters. This gives data of the string of parallax images corrected for the keystone distortion.

The data of the new string of parallax images is data of a string of parallax images recorded on a holographic stereogram, and the images making up the string of parallax images are recorded as elementary holograms making up the holographic stereogram.

If the data of the new string of parallax images generated by the image data generating method is data of a string of parallax images recorded on a holographic stereogram, data of the string of parallax images subjected to viewing point conversion processing is sequentially outputted in a timed relation to the recording of each elementary hologram in terms of an image of the string of parallax images as a unit.

According to the present invention, data of a new string of parallax images can be generated expeditiously by performing viewing point conversion processing on data of a string of parallax images made up of plural images containing the parallax information. Thus, a holographic stereogram, for example, can be prepared expeditiously.

BRIEF DESCRIPTION OF THE DRAWINGS

FIGS. 6A and 6B show an illustrative structure of an optical system of a holographic stereogram printer device.

FIG. 14 shows a typical lookup table.

DESCRIPTION OF THE PREFERRED EMBODIMENTS

Figure 1:
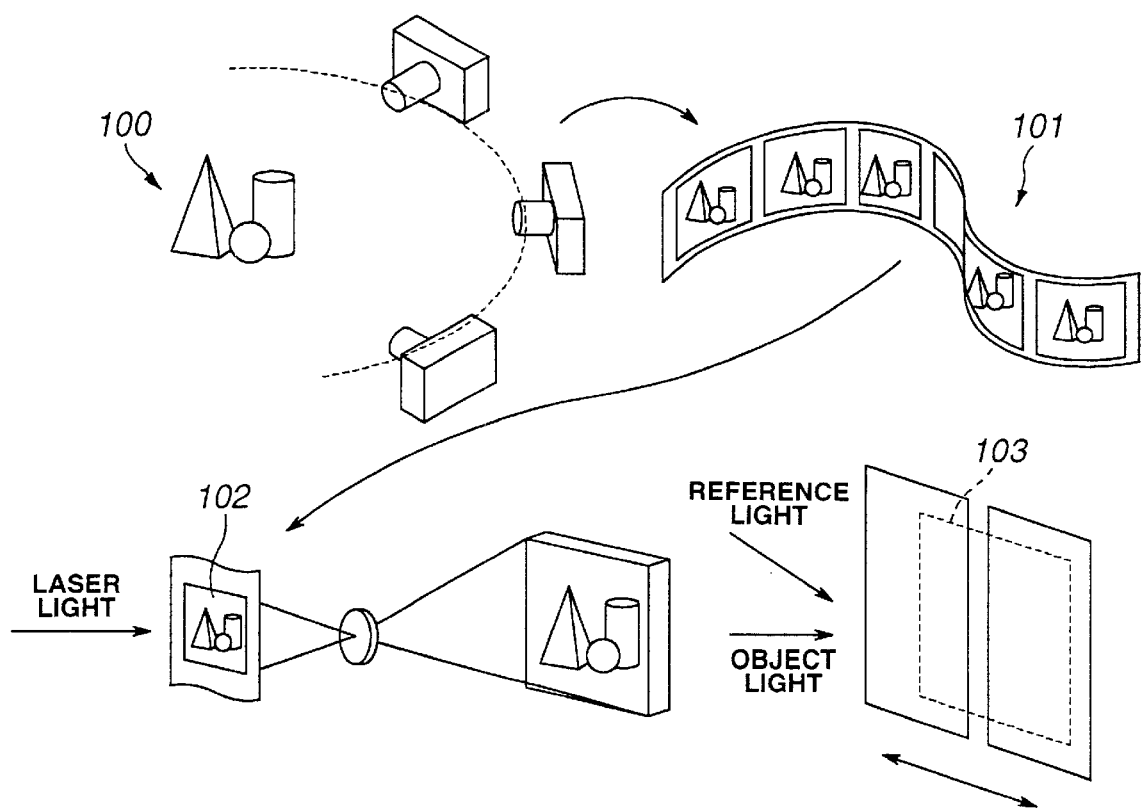
FIG. 1 schematically shows the method for preparing a holographic stereogram.

Referring to the drawings, preferred embodiments of the present invention will be explained in detail, taking an example of a system for preparing a holographic stereogram.

Although the system for preparing a holographic stereogram is taken as an example in the following description, the present invention is applicable extensively to any fields of application in need of the viewing point conversion processing. That is, the present invention can be applied to exploiting the viewing point conversion processing for stereoscopically displaying an image by taking advantage of the parallax.

First, the overall structure of the system for preparing a holographic stereogram is explained. In the system for preparing a holographic stereogram, now explained, a film-shaped recording medium for hologram, on which are recorded interference fringes of the object light and the reference light, is directly outputted as the holographic stereogram. The holographic stereogram, comprised of the interference fringes of the object light and the reference light directly recorded on the recording medium for hologram, is generally termed a one-step holographic stereogram. That is, the system for preparing a holographic stereogram, as now explained, is typical of the system for preparing the one-step holographic stereogram.

Figure 5:
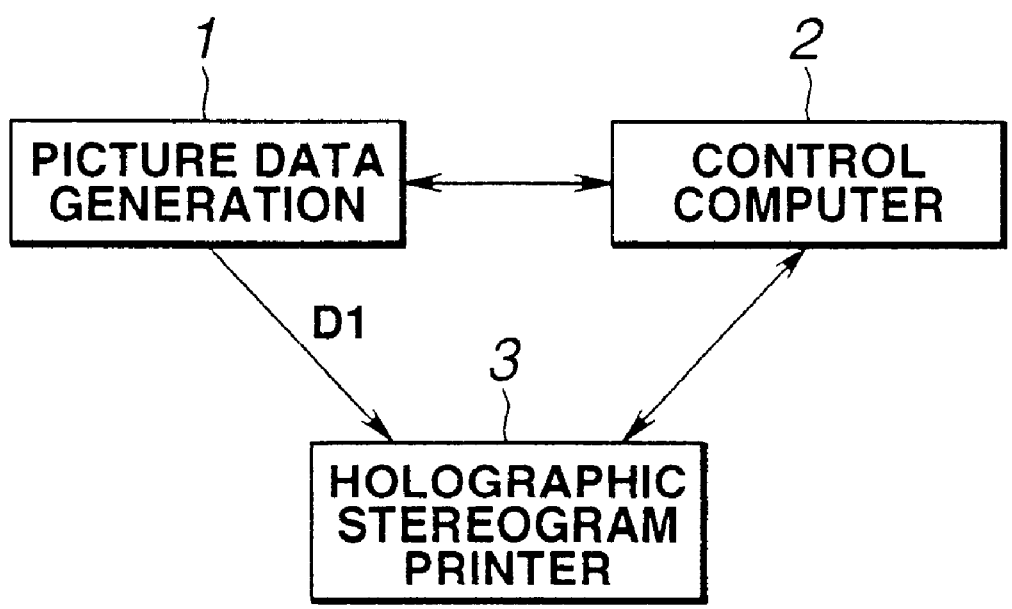
FIG. 5 is a block diagram showing an illustrative structure of a system for preparing a holographic stereogram.

The system for preparing a holographic stereogram includes an image data generating device 1 for generating image data of an image adapted for being recorded on a holographic stereogram, a control computer 2 for controlling the entire system, and a holographic stereogram printer device 3 having an optical system for preparing the holographic stereogram, as shown in FIG. 5.

The image data generating device 1 generates image data of plural images, corresponding to plural elementary holograms recorded on a holographic stereogram, that is data of a string of parallax images, in accordance with the present invention. The manner in which the image data are generated by the present image data generating device 1 will be explained subsequently.

In recording images on the recording medium for holograms, the image data generating device 1 sends generated image data D1 to the holographic stereogram printer device 3 on the image basis in the sequence of recording the image data on the recording medium for holograms, while sending timing signals indicating the sending of the image data D1 to the control computer 2.

The control computer 2 drives the holographic stereogram printer device 3 based on timing signals from the image data generating device 1 for sequentially recording images corresponding to the image data D1 generated by the image data generating device 1 as strip-shaped elementary holograms on a recording medium for holograms set in the inside of the holographic stereogram printer device 3.

At this time, the control computer 2 controls a light-exposure shutter and a recording medium feed mechanism, provided in the holographic stereogram printer device 3, as will be explained subsequently. That is, the control computer 2 sends control signals to the holographic stereogram printer device 3 to control the opening/closure of the light exposure shutter or the feed of the recording medium for holograms by a recording medium feed unit, not shown.

The holographic stereogram printer device 3 will be explained in detail with reference to FIGS. 6A and 6B, showing the optical system of the entire holographic stereogram printer device from above and showing the object light portion of the optical system of the holographic stereogram printer device 3 from its lateral side.

The holographic stereogram printer device 3 includes a laser light source 31 for radiating the laser light of a pre-set wavelength, a shutter for light exposure 32 arranged on the optical axis of the laser light L1 from the laser light source 31, and a half-mirror 33, as shown in FIG. 6A.

The shutter for light exposure 32 is controlled by the control computer 2 and is closed or opened if the recording medium for holograms 30 is to be exposed to light or not exposed to light, respectively. The half-mirror 33 is used for splitting the laser light L2 traversing the shutter for light exposure 32, with the light L3 reflected by the half-mirror 33 serving as the reference light and with the light L4 transmitted through the half-mirror 33 serving as the object light.

On the optical axis of the light L3, reflected by the half-mirror 33, there are arranged, as an optical system for the reference light, a cylindrical lens 34, a collimator lens 35 for collimating the reference light, and a total reflection mirror 36 for reflecting the collimated light from the collimator lens 35, in this order.

The light reflected by the half-mirror 33 is first by the cylindrical lens 34 and then collimated by the collimator lens 35. The collimated light then is reflected by the total reflection mirror 36 so as to fall on the recording medium for holograms 30.

On the optical axis of the light L4, transmitted through the half-mirror 33, there are arranged, as an optical system for the object light, a total reflection mirror 38, reflecting the transmitted light from the half-mirror 33, a spatial filter 39, combined from a convex lens and a pin-hole, a collimator lens 40 for collimating the object light, a display device 41 for displaying an image to be recorded, and a cylindrical lens 42 for converging the object light on the recording medium for holograms 30, in this order, as shown in FIGS. 6A and 6B.

The light L4, transmitted through the half-mirror 33, is reflected by the total reflection mirror 38 and then is turned into the diffused light from a point light source by the spatial filter 39. The diffused light is collimated by the collimator lens 40 to fall on the display device 41. The display device is a transmission type image display device comprised of a liquid crystal panel and displays an image corresponding to the image data D1 sent from the image data generating device 1. The light transmitted through the display device 41 is modulated in accordance with an image displayed on the display device 41 to fall on a cylindrical lens 42.

The light transmitted through the display device 41 is converged horizontally by the cylindrical lens 42 to fall as object light on the recording medium for holograms 30. That is, with the present holographic stereogram printer device 3, the projected light from the display device 41 falls on the recording medium for holograms 30 as strip-shaped object light.

Of the reference light and the object light, the reference light is adapted to fall on one of the major surfaces of the recording medium for holograms 30, while the object light is adapted to fall on its opposite side major surface. That is, the reference light is adapted to fall at a pre-set angle of incidence on one of the major surfaces of the recording medium for holograms 30, while the object light is adapted to fall on its opposite side major surface so that its optical axis will be substantially perpendicular to the recording medium for holograms 30. This causes interference between the reference light and the object light on the recording medium for holograms 30 such that resulting interference fringes are recorded as changes in the refractive index on the recording medium for holograms 30.

The holographic stereogram printer device 3 also includes a recording medium feed unit 43 adapted for intermittently feeding the recording medium for holograms 30 under control of the control computer 2. Each time an image corresponding to the image data D1 generated by the image data generating device 1 is recorded as an elementary hologram on the recording medium for holograms 30 set in a predetermined state on the recording medium feed unit 43, the latter intermittently feeds the recording medium for holograms every elementary hologram in accordance with the control signals fed from the control computer 2. This sequentially records images corresponding to the image data D1 generated by the image data generating device 1 as elementary holograms on the recording medium for holograms 30 so that the images lie contiguously to one another in the horizontal direction.

Meanwhile, in the holographic stereogram printer device 3, the length of the optical path of the reference light reflected by the half-mirror 33 to fall on the recording medium for holograms 30 is preferably equal to that of the object light transmitted through the half-mirror 33 to fall through the display device 41 on the recording medium for holograms 30. This elevates the coherence between the reference light and the object light to improve the picture quality of the holographic stereogram.

Also, in the holographic stereogram printer device 3, a diffusion plate may be provided on the optical path of the object light to improve the picture quality of the holographic stereogram. By arranging the diffusion plate on the optical path of the object light, any noise components contained in the object light are diffused, while the light intensity distribution of the object light falling on the recording medium for holograms is more even to improve the picture quality of the produced holographic stereogram.

It should be noted that, if the diffusion plate is used, a mask having a strip-shaped opening in meeting with the shape of the elementary hologram be provided between the diffusion plate and the recording medium for holograms 30. If this mask is used, any excess portion of the object light scattered by the diffusion plate is shielded by the mask to enable the preparation of the holographic stereogram of a higher picture quality.

In the above-described holographic stereogram printer device 3, a one-dimensional diffusion plate for scattering the object light in the longitudinal direction may be provided on the optical path of the object light to accord the longitudinal angle of field to the holographic stereogram. By arranging the one-dimensional diffusion plate on the optical path of the object light, the object light is diffused in the longitudinal direction, that is along the long axis of the produced holographic stereogram, with the result that the produced holographic stereogram has the longitudinal angle of field.

It is noted that, if such one-dimensional diffusion plate is used, a louver film having fine reed-shaped lattice is preferably arranged between the recording medium for holograms 30 and the one-dimensional diffusion plate. By arranging this louver film, the reference light traversing the recording medium for holograms 30 can be prevented from being reflected by the one-dimensional diffusion plate to fall again on the recording medium for holograms 30.

The above-described system for preparing the holographic stereogram operates as follows:

When preparing a holographic stereogram, the image data generating device 1 sends out the image data D1 to the display device 41 of the holographic stereogram printer device 3 to cause an image for light exposure corresponding to the image data D1 to be displayed on the display device 41. At this time, the image data generating device 1 sends to the control computer 2 a timing signal indicating that the image data D1 has been sent to the display device 41 of the holographic stereogram printer device 3.

The control computer 2 on reception of the timing signal sends a control signal to the shutter for light exposure 32 to open the shutter for light exposure 32 only for a pre-set time duration. This permits the recording medium for holograms 30 to be exposed to light.

Of the laser light L2 radiated from the laser light source 31 and transmitted through the shutter for light exposure 32, the light L3 reflected by the half-mirror 33 falls on the recording medium for holograms 30 as the reference light. The light L4 transmitted through the half-mirror 33 is the projected light carrying the image displayed on the display device 41. This projected light falls on the recording medium for holograms 30 as the object light. The image for light exposure, displayed on the display device 41, is recorded as a strip-shaped elementary hologram on the recording medium for holograms 30.

When the recording of an image on the recording medium for holograms 30 comes to a close, the control computer 2 sends a control signal to the recording medium feed unit 43 to feed the recording medium for holograms 30 by one elementary hologram.

The above operation is repeated on the condition that the images for light exposure displayed on the display device 41 are sequentially changed in the sequence of the images of the string of the parallax images. This sequentially records the images for light exposure corresponding to the image data generated by the image data generating device 1 as strip-shaped elementary holograms on the recording medium for holograms 30.

If, when sequentially recording the elementary holograms, the recording medium for holograms is fed by the recording medium feed unit 43, there are occasions wherein the recording medium for holograms 30 is oscillated slightly. In such case, oscillations are allowed to subside each time the recording medium for holograms 30 is fed and the elementary holograms are recorded after subsidence of the oscillations.

With the above-described system for producing the holographic stereogram, plural images for light exposure corresponding to the image data generated by the image data generating device 1 are sequentially displayed on the display device 41, while the shutter for light exposure 32 is opened every image so that the images are sequentially recorded on the recording medium for holograms 30 as strip-shaped elementary holograms. Since the recording medium for holograms 30 is fed at a rate of one elementary hologram per image, the elementary holograms are arrayed so contiguously in the horizontal direction. This records the string of parallax images made up of plural images containing the parallax information in the horizontal direction on the recording medium for holograms 30 as horizontally contiguous plural elementary holograms to produce a holographic stereogram having parallax in the horizontal direction.

The image data generating device 1 used in the above-described holographic stereogram producing system is explained in detail.

The image data generating device 1 has an imaging device for imaging a string of parallax images from which the holographic stereogram is prepared.

There are a variety of methods for obtaining a parallax image by an imaging device. For example, an image 50 may be fixed and a camera 51 for obtaining an image thereof is translated to obtain a large number of images of the object 50 from different positions. That is, the camera 51 is moved in a pre-set direction by a pre-set pitch each time an image is shot, as indicated by arrow A1 in FIG. 7. This gives a string of parallax images having the parallax in the horizontal direction.

Figure 2:
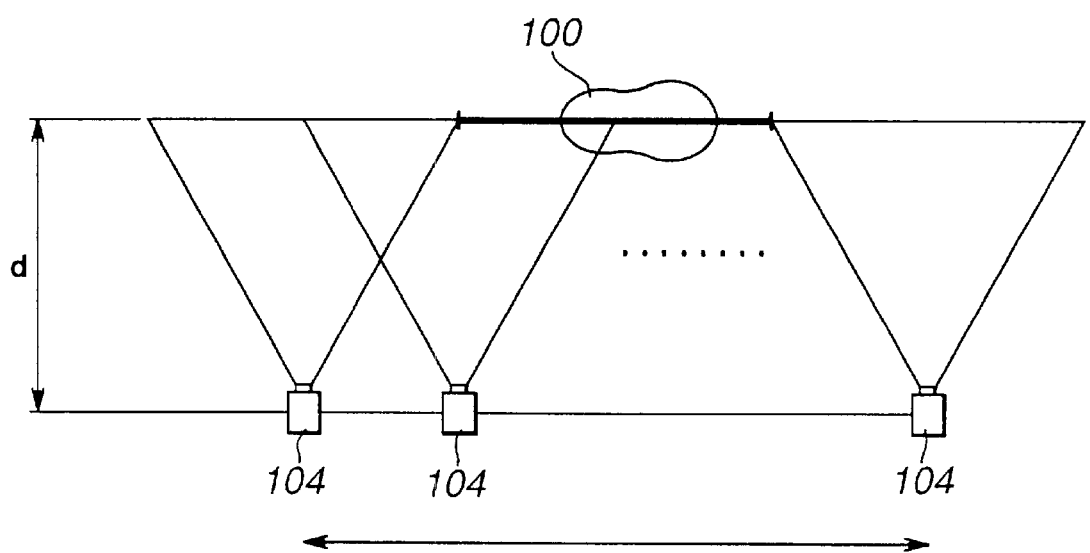
FIG. 2 schematically shows the imaging method by a straight track system.
Figure 7:
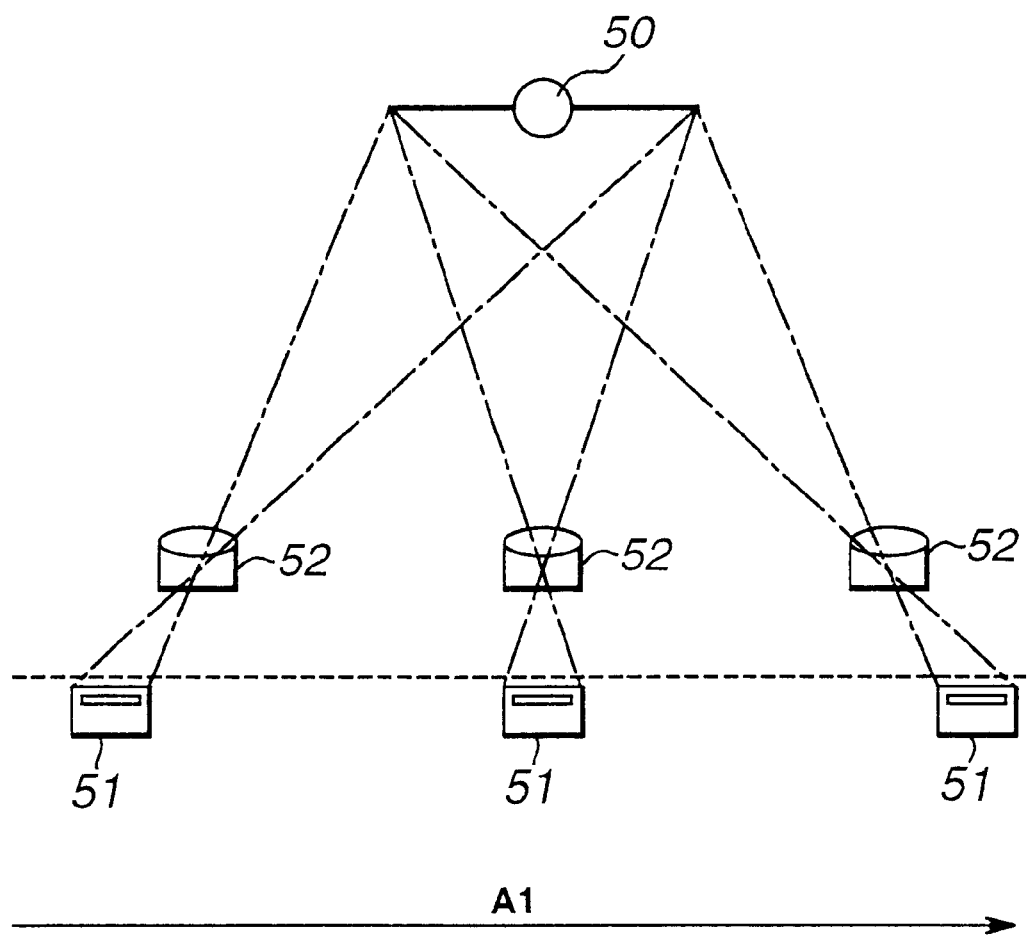
FIG. 7 schematically shows a method for imaging a string of parallax images by the re-centering system.

Although the straight track system shown in FIG. 2 may be used for imaging the string of parallax images, a lens 52 of the camera 51 is moved, in the present embodiment, in meeting with the shooting position, so that the image of the object 50 will be perpetually positioned at the center of a viewing screen, as shown in FIG. 7. This system of shooting an image of the object 50 so that the image will perpetually be at the center of the viewing screen is termed the re-centering system.

When actually generating the string of parallax images, the camera 51 is moved a pre-set pitch, each time an image is shot, to vary continuously the viewing point of the camera 51 relative to the object 50, in order to obtain e.g., 500 to 1000 images. This gives a string of parallax images made up of a large number of images having the parallax in the horizontal direction.

Although the above-described method is the method of generating a string of parallax images by actual imaging, the string of parallax images used for preparation of the holographic stereogram may also be generated using computer graphics. In this case, an object and a camera are imaginarily placed in the space of the computer graphics and the camera is translated as in the embodiment shown in FIG. 3 in order to shoot the object a number of times from different positions. Stated differently, the viewing point of the camera is moved at a predetermined pitch and data of plural images are generated by rendering images of the object as viewed from different viewing points. This gives a string of parallax images similar to that obtained on actual imaging.

Figure 3:
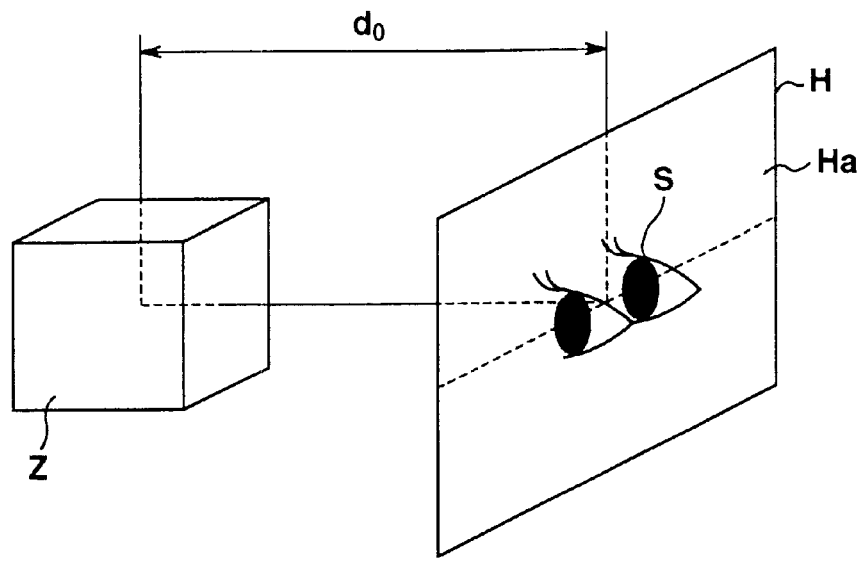
FIG. 3 schematically shows how the reproduced image of the holographic stereogram prepared without viewing point conversion processing is viewed.

Meanwhile, in the holographic stereogram, prepared by directly using the string of parallax images, shot as shown in FIG. 7, the relative position between the viewing point of the camera 51 and the object 50 at the time of imaging is kept in the reproduced image of the prepared holographic stereogram. Therefore, if the holographic stereogram is prepared directly using the string of parallax images, obtained as described above, the images are formed in a recessed position from the hologram surface Ha of the holographic stereogram H a distance proportionate to the imaging distance at the time of the string of the parallax images, as shown in FIG. 3. Thus, in such holographic stereogram H, distortions or blurring is produced in the reproduced image Z, unless the viewing point S is placed on the hologram surface Ha to view the reproduced image Z so that the distance $d_0$ between the reproduced image Z and the viewing point S of the viewer coincides with the distance from the object 50 to the camera 51 at the time of shooting.

In particular, in the white holographic stereogram, reproduced by the white light, the reproduced image Z is blurred the further the imaging position of the reproduced image Z is from the hologram surface Ha, so that, if the reproduced image Z is formed at a recessed position with respect to the hologram surface Ha, the reproduced image Z is blurred significantly.

Figure 4:
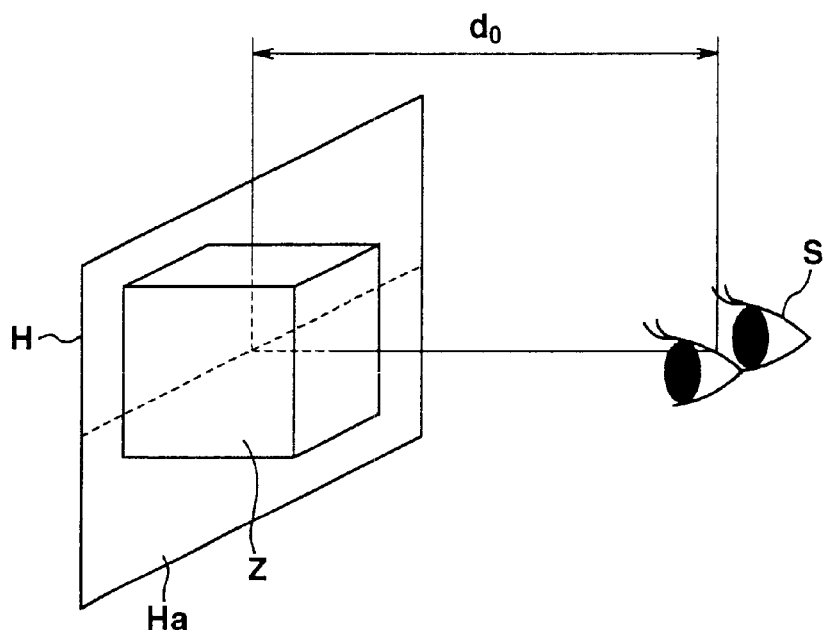
FIG. 4 schematically shows how the reproduced image of the holographic stereogram prepared with viewing point conversion processing is viewed.

Thus, with the image data generating device 1, the string of parallax images, obtained as described above, is subjected to viewing point conversion processing so that the reproduced image Z will be formed in the vicinity of the hologram surface Ha as shown in FIG. 4. That is, the image data generating device 1 performs viewing point conversion processing on a string of parallax images so that the reproduced image Z will be fixed in the vicinity of the hologram surface Ha of the holographic stereogram H, and the holographic stereogram is prepared using the string of parallax images subjected at the outset to the viewing point conversion processing.

By such viewing point conversion processing, the reproduced image Z is fixed in the vicinity of the hologram surface Ha, as shown in FIG. 4, so that, if the viewing point S is set away from the hologram surface Ha, a clear reproduced image may be produced which is distorted or blurred only to a limited extent.

Figure 8:
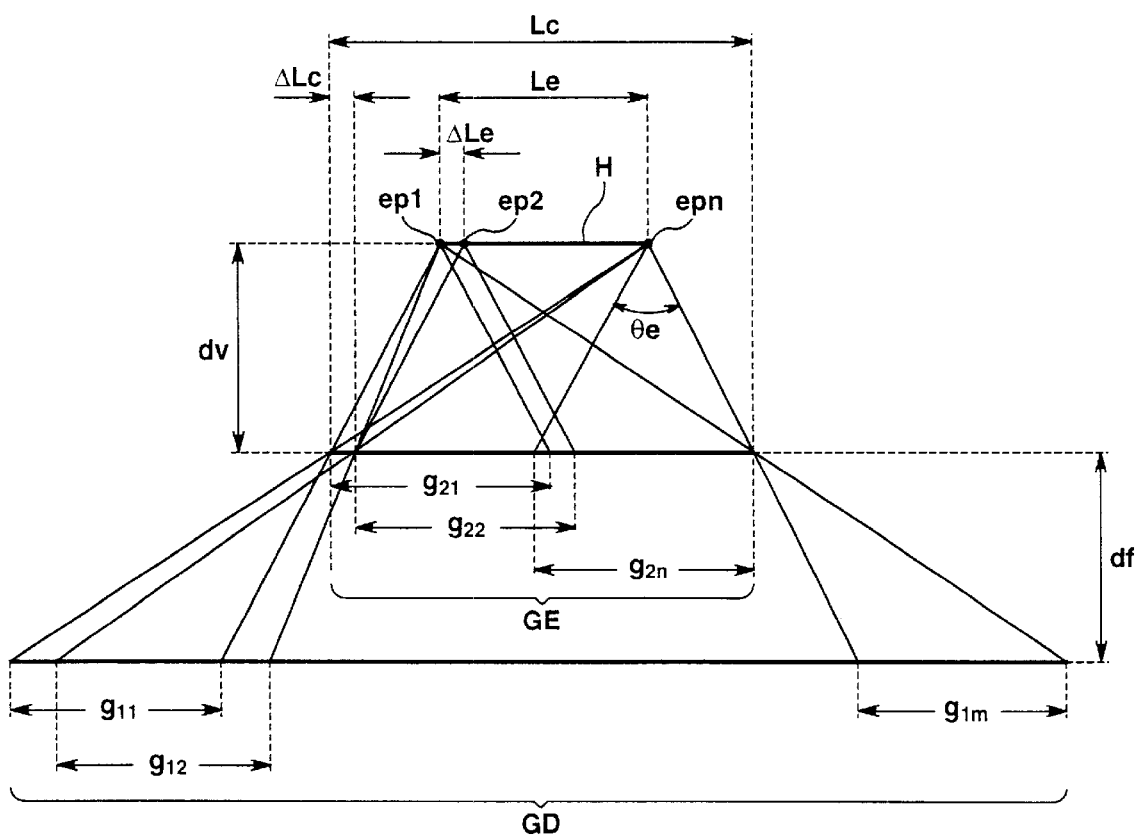
FIG. 8 shows the relation between a string of parallax images for light exposure GE and an original string of parallax images GD for illustrating the viewing point conversion processing.
Figure 9:
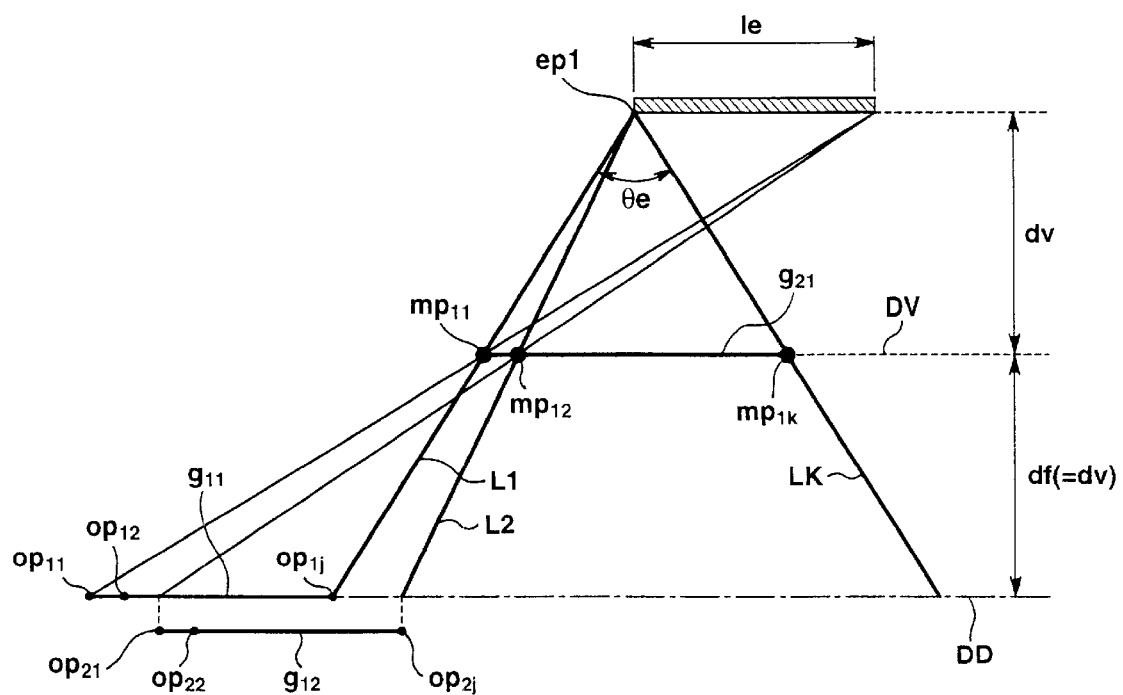
FIG. 9 shows the relation between an image g21 of the string of parallax images for light exposure GE and images g11, g12, . . . , g1m of the original string of parallax images GD.

A specified example of the viewing point conversion processing is explained with reference to FIGS. 8 and 9 illustrating the principle of subjecting a string of parallax images comprised of m images shot by the re-centering system, referred to hereinafter as the original string of parallax images, to re-construct a new string of parallax images comprised on n images, referred to hereinafter as a string of parallax images for light exposure.

It should be noted that the string of parallax images for light exposure is a string of parallax images used for preparation of the holographic stereogram. Specifically, the images of the string of parallax images for light exposure, subjected previously to viewing point conversion processing, are sequentially displayed on the display device 41 to produce a holographic stereogram.

Although an example is explained herein in which the viewing point conversion processing is performed on the string of parallax images produced in accordance with the above-mentioned re-centering system, that is the original string of parallax images, to produce a new string of parallax images, that is a string of parallax images for light exposure, the technique of the viewing point conversion processing is not limited to the example as now explained and a variety of suitable techniques may optionally be used in dependence upon the string of parallax images to be subjected to viewing point conversion processing.

In FIG. 8, g11, g12, ... g1m represent images making up the original string of parallax images. The original string of parallax images made up of these images g11, g12, ... g1m are denoted as GD. On the other hand, g21, g22, ... g2n represent images making up the string of parallax images for light exposure. The string of parallax images for light exposure made up of these images g21, g22, ... g2n are denoted as GE.

FIG. 8 shows the relative position among respective light exposure points ep1, ep2, ... epn of the holographic stereogram H having a length Le along the parallax direction, respective images g21, g22, ..., g2n making up the string of parallax images for light exposure GE and respective images g11, g12, ..., g1n making up the original string of parallax images. In the light exposure points ep1, ep2, ..., epn of the holographic stereogram H, the images g21, g22, ..., g2n making up the string of parallax images for light exposure GE are recorded as elementary holograms.

Although only the three points ep1, ep2, epn are shown as light exposure points for convenience of illustration, n light exposure points actually exist in the holographic stereogram H, such that n images g21, g22, ..., g2n making up the string of parallax images for light exposure GE are recorded at different light exposure points as elementary holograms.

The number of the light exposure points corresponds to the number n of the images making up the string of parallax images for light exposure GE. This number of the light exposure points depends on the transverse size Le of the holographic stereogram H and the pitch ΔLe of the light exposure points as indicated by the following equation:

$$Le = n \times \Delta Le \ldots \quad (1)$$

That is, if the transvwerse size Le of the holographic stereogram H is 10 cm and the light exposure pitch is constant and equal to 0.2 mm, the number of light exposure points is 500.

Meanwhile, the pitch ΔLe of the light exposure points means the pitch of the elementary holograms and represents one of parameters prescribing the resolution of the holographic stereogram S. That is, the smaller the pitch ΔLe of the light exposure points, the higher is the resolution of the produced holographic stereogram.

In FIG. 8, ΔLc denotes the displacement of the camera 51 for each shooting of the image at the time of imaging the original string of parallax images GD. This displacement of the camera 51 is hereinafter termed a camera movement pitch. On the other hand, Lc denotes the sum of the displacement of the camera 51 during imaging of the original string of parallax images GD, while $d_f$ denotes the distance between the camera 51 and the object 50 during imaging of the original string of parallax images GD, referred to hereinafter as the imaging distance, and $d_v$ denotes the distance between the viewing point S of the viewer of the holographic stereogram H and the hologram surface Ha, referred to hereinafter as the viewing point distance.

Although the pitch ΔLe of the light exposure points may be set so as to be equal to the camera displacement pitch ΔLc, these need not necessarily be equal to each other. On the other hand, the viewing point distance $d_v$ is set so as to be equal to the imaging distance $d_f$.

In the respective light exposure points of the holographic stereogram H, the images g21, g22, ..., g2n making up the string of parallax images for light exposure GE are exposed to light at a pre-set light exposure angle Θe.

It is noted that the resolution of the images g11, g12, ..., g1m making up the original string of parallax images GD and that of the images g21, g22, ..., g2n making up the string of parallax images for light exposure GE are both 640 pixels in the longitudinal direction and 480 pixels in the transverse direction (parallax direction). Although the resolution of 640 by 480 pixels is taken as an example, the number of pixels making up the images is arbitrary and is not limited to that given in the present embodiment.

In the viewing point conversion processing, plural images with converted viewing point positions are reconstructed from the respective images g11, g12, ..., g1m making up the original string of parallax images GD to generate a string of parallax images for light exposure GE. Specifically, the relation of correspondence between the pixels of the respective images g11, g12, ..., g1m making up the original string of parallax images GD and the pixels of images g21, g22, ..., g2n making up the string of parallax images for light exposure GE is found at the outset and a lookup table showing this relation of correspondence is formulated. The viewing point conversion processing is executed by interchanging the pixels based on this lookup table to reconstruct the images g21, g22, ..., g2n making up the string of parallax images for light exposure GE from the images g11, g12, ..., g1m making up the original string of parallax images GD.

The pixel interchanging is carried out with a slit-shaped string of 640 longitudinal pixels and 1 transverse pixel as the minimum unit. That is, in the viewing point conversion processing, pixels as required are extracted on the pixel line basis from the images g11, g12, ..., g1m making up the original string of parallax images GD to re-construct new images g21, g22, .., g2n. By handling plural pixels at a time for pixel interchanging, the viewing point conversion processing can be reduced in processing volume significantly as compared to the case of individually handling the respective images. Moreover, since the slit-shaped pixel line of 640 longitudinal pixels and 1 transverse pixel represents the minimum unit of the parallax information, there is no risk of the parallax information being lost by this pixel-string-based pixel interchanging.

This viewing point conversion processing is explained in more detail by referring to FIG. 9 showing how the image g21 of the images making up the string of parallax images for light exposure GE is taken out to re-construct the image g21 from the original string of parallax images GD.

In re-constructing the image g21, it is assumed that the image g21 is on a plane DV spaced a viewing distance $d_v$ from the holographic stereogram H. It is noted that the image g21 is at a pre-set angle of field Ge with respect to the light exposure points ep1 for the image g21.

It is also assumed that the images g11, g12, ..., g1m making up the original string of parallax images GD are on a plane spaced an imaging distance df from the image g21. The images g11, g12, ..., g1m making up the original string of parallax images GD are arranged on a plane DD in register with the viewing point positions during imaging of the object 50.

Straight lines L1, L2, ..., Lk, interconnecting the light exposure points ep1 for the imager g21 to sampling points mp11, mp12, ..., mp1k, referred to hereinafter as mapping lines L1, L2, ..., Lk, are considered. The sampling points mp11, mp12, ..., mp1k correspond to the image row making up the image g21, with the number k of the sampling points corresponding to the number of pixels in the horizontal direction (parallax direction) of the image g21. Thus, if the image g21 is made up of, for example, 640 longitudinal pixels and 480 transverse pixels, k=480.

Based on the mapping lines L1, L2, ..., Lk, the one of the images g11, g12, ..., g1m making up the original string of parallax images GD having the closest viewing point to the sampling points mp11, mp12, ..., mp1k is selected every sampling point, and an image row having the closest viewing point is selected from the selected images.

Taking an example of the sampling point mp11, the image g11 having the closest viewing point to the viewing point a the sampling point mp11 is selected from the images g11, g12, ..., g1m of original string of parallax images GD. The mapping line L1 interconnecting the light exposure points ep1 and the sampling point mp11 is extended to the plane DD, and the sampling point op1j closest to the point of intersection of the mapping line L1 with the plane DD is selected from the sampling points op11, op12, ..., op1j of the image g11. The image string positioned at the so-selected sampling point opj1 is extracted from the image g11 and mapped to the sampling point mp11 of the image g21.

In the embodiment of FIG. 9, it is assumed that there exist j sampling points for each of the images g11, g12, ..., g1m of original string of parallax images GD. For example, there exist sampling points op11, op12, ..., op1j for the image g11 of the original string of parallax images GD, while there exist sampling points op21, op22, ..., op2j for the image g12. For other images, there exist j sampling points. These sampling points are associated with the image strings of the images g11, g12, ..., g1m, with the number of the sampling points corresponding to the number of pixels in the transverse direction, that is in the parallax direction, of the respective pixels. Therefore, if the images g11, g12, ..., g1m are each made up of longitudinal 640 pixels and 480 transverse pixels, j=480.

A sole new image g21 is re-constructed by carrying out the above-described mapping for other sampling points mp12, ..., mp1k of the image g21. Also, images 22, g23, ..., g2n associated with respective light exposure points ep2, ep3, ..., epn are re-constructed by carrying out the similar processing for these other light exposure points. This gives a string of parallax images obtained on viewing point conversion processing and re-construction, that is the string of parallax images for light exposure GE.

A holographic stereogram is prepared by sequentially displaying the respective pixels g21, g22, ..., g2n making up the string of parallax images for light exposure GE as described above and by recording the images as slit-shaped elementary holograms on the recording medium for holograms 30.

With the holographic stereogram, thus produced, the viewing point is shifted by the viewing distance $d_v$ from the hologram surface towards the viewer by the viewing point conversion processing, such that the reproduced image is shifted by the viewing distance $d_v$ towards the viewer and is fixed in the vicinity of the hologram surface. Thus, with the present holographic stereogram, a reproduced image is produced which suffers from distortion or blurring only to a lesser extent.

Meanwhile, the above-described viewing point conversion processing is realized by doing pixel interchanging at all times in a similar manner, irrespective of the original string of parallax images GD, on the condition that the parameters, such as the imaging distance, at the time of imaging the original string of parallax images GD, or the parameters of the holographic stereogram to be prepared, such as light exposure pitch, remain constant.

Therefore, if the relation of correspondence between the pixels of the respective images making up the original string of parallax images GD and pixels of the respective images making up the string of parallax images for light exposure GE is calculated at the outset stored in a lookup table, the viewing point conversion processing can be realized simply by interchanging the pixels based on the lookup table a without executing complicated calculations each time the viewing point conversion processing is performed.

In particular, in the viewing point conversion processing for the string of parallax images having only the horizontal parallax, it is sufficient if the pixel-string based relation of correspondence is stored in the lookup table. In such case, the string of parallax images for light exposure GE may be obtained solely by doing pixel-string based interchanging based on the lookup table.

Thus, with the system for preparing the holographic stereogram according to the present invention, lookup table storage means is provided in the image data generating device 1 for storage of the lookup table therein and the viewing point conversion processing is performed by having reference to this lookup table.

The holographic stereogram producing system, including the detailed structure of the image data generating device 1 responsible for the viewing point conversion processing as described above, is further explained in detail.

The holographic stereogram producing system includes an image data generating device 1, a control computer 2 and a holographic stereogram printer device 3, as shown in FIG. 5. The inner structure of the system is shown in FIG. 10.

Figure 10:
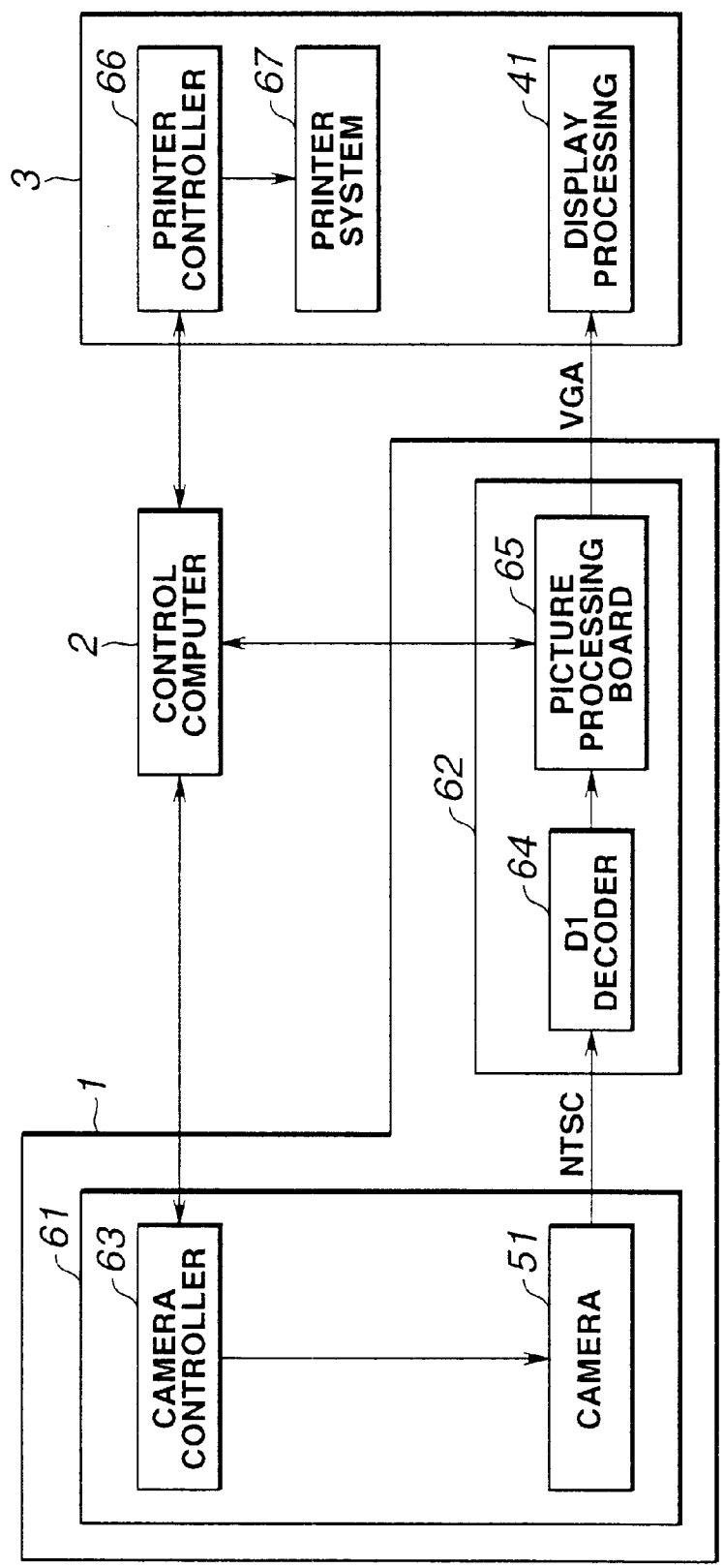
FIG. 10 is a detailed block diagram showing the structure of the system for preparing the holographic stereogram shown in FIG. 5.

The image data generating device 1 includes a parallax image string imaging system 61 for imaging a string of parallax images, and an image data processing unit 62 for performing the viewing point conversion processing on the string of parallax images obtained by the parallax image string imaging system 61, as shown in FIG. 10.

The parallax image string imaging system 61 includes a camera 51 displaced as described above to image the string of parallax images and a camera controller 63 for controlling the camera 51. As the camera 51, a still camera or a video camera employing a charge-coupled device (CCD) in its photosensitive portion is preferred. On the other hand, the image data processing unit 62 includes a D1 decoder 64 and an image processing board 65, with a built-in viewing point conversion processing device.

In the image data generating device 1, the parallax image string imaging system 61 controls the camera 51 by the a camera controller 63, based on control signals from the control computer 2, to shoot the string of parallax images, as shown in FIG. 7, to send signals of various images making up the string of parallax images to the D1 decoder 64 of the image data processing unit 62. That is, the string of parallax images, that is the original string of parallax images GD, is imaged by shooting a large number of images, as the camera 51 is displaced under control by the camera controller 63.

When shooting the images by the camera 51, the present parallax image string imaging system 61 outputs signals of the images to the D1 decoder 64 of the image data processing unit 62. The camera 51 sends signals of respective images making up the string of parallax images to the D1 decoder 64 as, for example, video signals of the NTSC system.

The D1 decoder 64 digitizes image signals sent from the camera 51 to convert the signals into D1 format signals. This converts the image signals into YUV422 signal, with data of the chroma components being approximately halved. The picture data, converted into the D1 format data by the D1 decoder 64, is sent to the image processing board 65.

By supplying image data, converted by the D1 decoder 64 into D1 format data, to the image processing board 65, the image data volume entered to the image processing board 65 may be reduced, thus suppressing the memory capacity required of the image processing board 65.

Although the D1 format is used here for suppressing the data volume of image data subjected to viewing point conversion processing, it is o course possible to use other formats for digital image signals.

The image processing board 65 performs viewing point conversion processing on the D1 format image data, under control by the control computer 2, in order to generate a new string of parallax images subjected at the outset to viewing point conversion processing, that is the string of parallax images for light exposure GE. The image processing board 65 synchronizes the data of respective images making up the string of parallax images for light exposure GE with the recording timing of the elementary holograms by the holographic stereogram printer device 3, under control by the control computer 2, to send the data to the display device 41 of the holographic stereogram printer device 3.

It is noted that the holographic stereogram printer device 3 includes a display device 41, a printer controller 66 and a printer system 67 controlled by the printer controller 66. Meanwhile, the devices driven at the time of preparation of the holographic stereogram, such as the shutter for light exposure 32 or the recording medium driving unit 43, are collectively termed the printer system 67.

The holographic stereogram printer device 3 sequentially displays the respective images making up the string of parallax images for light exposure GE based on picture data sent from the image processing board 65. The holographic stereogram printer device 3 controls the printer system 67 by the printer controller 66, under control by the control computer 2, for sequentially recording the elementary holograms on the recording medium for holograms 30 in synchronism with the image display timing on the display device 41. This records the pictures of the string of parallax images for light exposure GE on the recording medium for holograms 30 as elementary holograms to complete the holographic stereogram.

Figure 11:
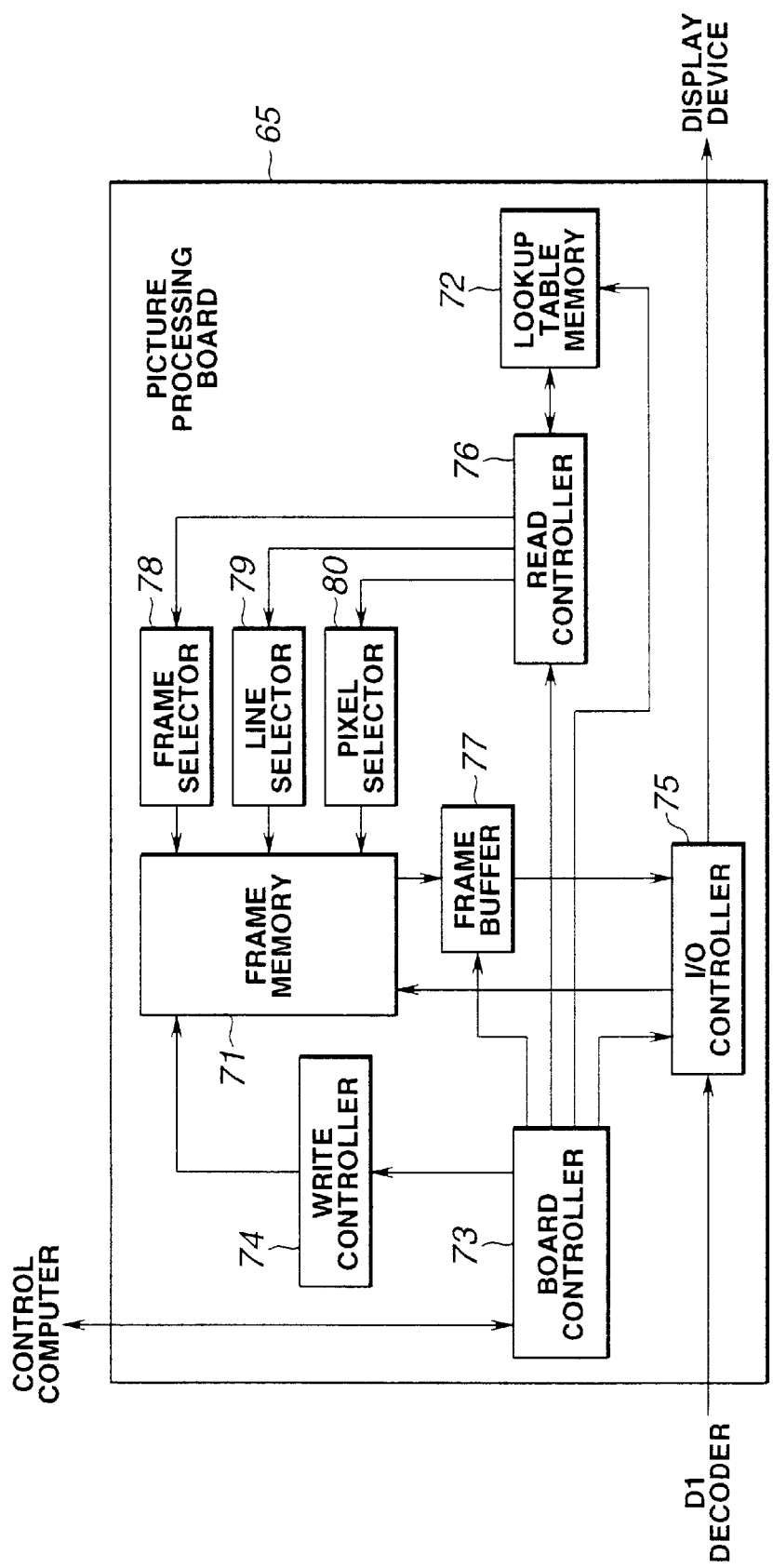
FIG. 11 is a block diagram showing the structure of an image processing board.

The structure of the image processing board 65 is further explained with reference to FIG. 11.

The image processing board 65 is made up of a frame memory 71 for sequentially storing data of the respective images making up the string of parallax images at e.g., the NTSC video rate, and a memory for lookup table 72 adapted for storing a lookup table to which reference is had at the time of viewing point conversion processing.

The frame memory 71 is preferably such a memory that has sufficiently high write/readout speed. Specifically, a DRAM of the fast page mode, for example, is preferred. When storing image data in the frame memory 71, control signals from the control computer 2 are sent via a board controller 73 controlling the interfacing with the control computer 2 to a write controller 74 controlling the writing to the frame memory 71. The write controller 74 drives the frame memory 71 based on the control signals from the control computer 2 so that image data sent from the D1 decoder 64 via an I/C controller 75 is sequentially written in the frame memory 71.

A lookup table memory 72 is lookup table storage means for storing the lookup table to which reference is had at the time of viewing point conversion processing. This lookup table memory 72 is preferably such a memory as has a sufficiently high readout speed. For example, a static random access memory (SRAM) is preferred. In this lookup table memory 72 is stored a lookup table specifying the relation of correspondence between pixels of respective images making up the original string of parallax images GD, which is a string of parallax images before viewing point conversion processing, and pixels of respective images making up the string of parallax images for light exposure GE, which is a new string of parallax images following the viewing point conversion processing.

Meanwhile, it is assumed that the string of parallax images has only horizontal parallax and that the pixel-string-based relation of correspondence instead of the pixel based relation of correspondence is recorded in the lookup table. That is, in the lookup table, the relation of correspondence between the pixels of respective images making up the original string of parallax images GD and the pixels of respective images making up the string of parallax images for light exposure GE is recorded with a string of pixels arrayed in a row as a minimum unit.

After the totality of data making up the original string of parallax images GD is stored as described above in the frame memory 71, the image processing board 65 performs the above-described viewing point conversion processing to generate data of respective images making up the string of parallax images for light exposure GE to output the image data sequentially.

The viewing point conversion processing is not the complex processing but is simply interchanging of the strings of pixels. That is, the viewing point conversion processing here is the processing of extracting data of images making up the string of parallax images for light exposure GE from the data of images making up the original string of parallax images GD on the pixel line basis to re-construct new data of images.

Specifically, control signals from the control computer 2 are sent via a board controller 73 to a read controller 76 adapted for controlling image data readout from the frame memory 71. Based on the control signals from the control computer 2, the read controller 76 selects data of images making up the string of parallax images for light exposure GE from the image data written in the frame memory 71 on the pixel line basis to write the image data in a frame buffer 77. At this time, the read controller 76 refers to the lookup table stored in the lookup table memory 72 to select picture data to be written in the frame buffer 77.

Between the read controller 76 and the frame memory 71, there are arranged a frame selector 78 adapted for selecting data on the image screen basis, a line selector 79 for selecting data on the scanning line basis and a pixel selector 80 on the pixel basis. When reading out data from the frame memory 71, data are selected by the frame selector 78, line selector 79 and the pixel selector 80.

A frame-equivalent portion of image data, read out from the frame memory 71 on the pixel line basis, is stored in the frame buffer 77. The image data stored in the frame buffer 77 is sent to the display device 41 of the holographic stereogram printer device 3, via an I/O controller 75, based on control signals sent from the control computer 2 via the board controller 73. This displays an image, subjected to viewing point conversion processing and re-construction, on the display device 41. The printer system 67 of the holographic stereogram printer device 3 then is driven to record the image as the elementary holograms on the recording medium for holograms 30.

The re-construction of the new image and the display of the image on the display device 41 are sequentially carried out in a timed relation to the recording of the elementary holograms every plural images making up the string of parallax images for light exposure GE to formulate the holographic stereogram.

The above-described data processing by the image processing board 65 is further explained in detail with reference to the timing chart shown in FIG. 12. It is assumed here that an image data output from the image processing board 65 is a video graphic array (VGA) having the effective resolution of 640 pixels by 480 pixels.

Figure 12A:
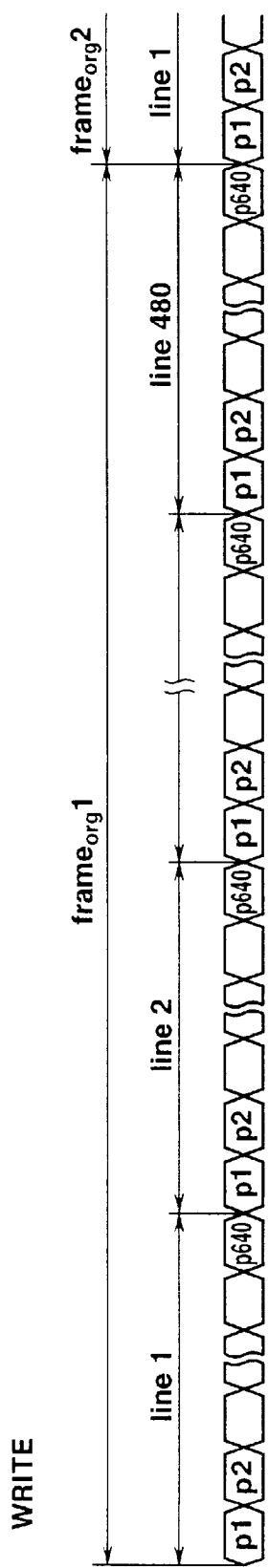
FIGS. 12A shows a typical timing chart at the time of writing image data on a frame memory.

At the same time as imaging of the string of parallax images by the camera 51 is started, a control signal commanding the capturing of image data shot by the camera 51 is sent from the control computer 2 to the image processing board 65 to start the writing of the image data in the frame memory 71 of the image processing board 65, as shown in FIG. 12A, which shows a timing chart of writing of the image data in the frame memory 71.

Referring to FIG. 12A, data of the images making up the string of parallax images are stored in the frame memory 71, at e.g., a NTSC video rate, in the sequence in which the data is imaged by the camera 51. In FIG. 12A, $frame_{org}1$, $frame_{org}2$ denote frame numbers of image data stored in the frame memory 71, whilst line 1, line 2, . . . , line 480 denote the scanning line numbers of the respective images and p1, p2, , . . . , p640 denote pixels on a scanning line.

Meanwhile, in the D1 format, the effective resolution per frame is 720 pixels by 485 pixels. However, since the image data output from the image processing board 65 is VGA, the image data sent from the D1 decoder 64 is subjected to resolution conversion processing and thereby turned into 640 pixels by 480 pixel data which is written in the frame memory 71.

After the imaging of the string of parallax images by the camera 51 has come to a close, and the data of the original string of parallax images GD is sent in their entirety to the image processing board 65, the control computer 2 sends a control signal indicating the termination of capturing of image data shot by the camera 51 to the image processing board 65 whereby writing of image data in the frame memory 71 is terminated.

Figure 13:
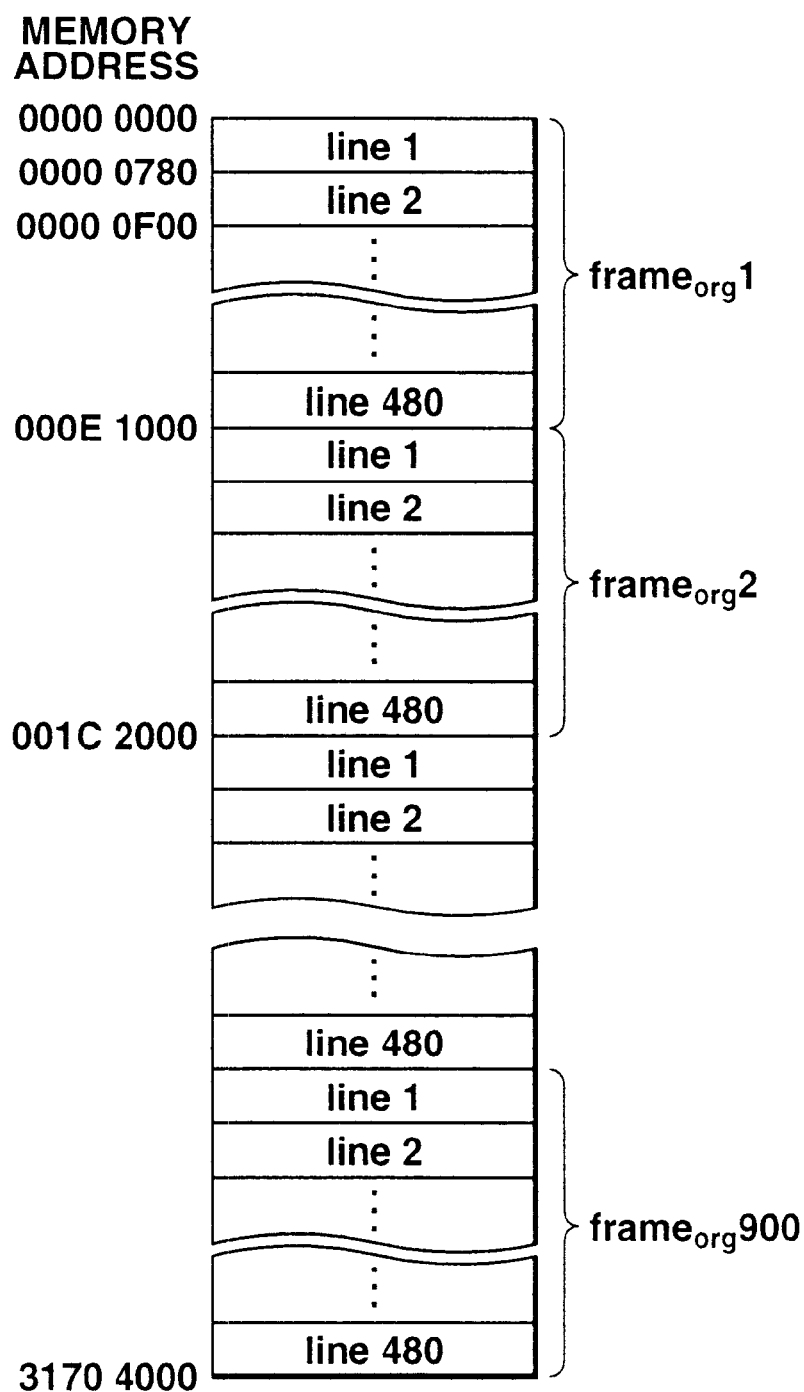
FIG. 13 shows an example of a memory map of the frame memory in which is stored data of the original string of parallax images GD.

In this manner, the original string of parallax images GD, made up of plural images, is stored in the frame memory 71 of the image processing board 65. FIG. 13 shows an example of the memory map of the frame memory 71 and specifically shows the arraying in the inside of the frame memory 71 of data of the original string of parallax images GD stored in the frame memory 71.

In the memory map, shown in FIG. 13, blanking signals etc included in the image signals are not shown for simplicity. The memory addresses shown in the memory map are given only for the sake of illustration and any other suitable memory addresses may be used provided that the addresses can be handled easily in view of the system configuration.

The image processing board 65 performs viewing point conversion processing on the data of the original string of parallax images GD stored in the frame memory 71 based on the lookup table. This viewing point conversion processing is realized by interchanging pixels, in terms of a pixel line on the scanning line as a unit, based on the lookup table. That is, the image processing board 65 extracts and reads the pixel line, necessary for re-constructing the images previously subjected to viewing point conversion processing, from the image data stored in the frame memory 71, by the frame selector 78, line selector 79 and the pixel selector 80, based on the lookup table information, to generate a new image.

As may be seen from FIG. 14, showing a typical lookup table, there are recorded the lookup table the frame numbers ($frame_{org}$) and the scanning line numbers of the original string of parallax images GD, associated with newly constructed images ($frame_{new}1$, $frame_{new}2$, . . . , $frame_{new}480$).

Based on the lookup table information, the image processing board 65 extracts and reads image data stored in the frame memory 71 on the pixel line basis, that is on the scanning line basis, to generate new images.

Figure 12B:
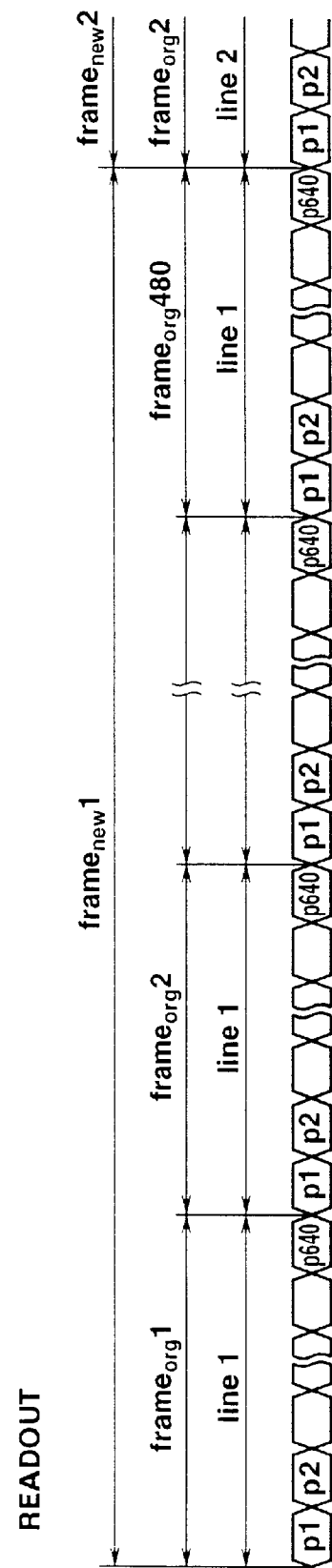
FIG. 12B shows a typical timing chart at the time of reading out image data from a frame memory.

FIG. 12B shows a typical timing chart of image data readout from the frame memory 71. In this figure, data of an image string on line 1 of the $frame_{org}1$, data of an image string on line 1 of the $frame_{org}1$, . . . , data of an image string on line 1 of the $frame_{org}480$, are sequentially extracted and read out in order to re-construct data of the new image $frane_{new}1$.

It should be noted that the timing chart shown in FIG. 12, frame numbers entered in the lookup table shown in FIG. 14 ($frame_{org}1$, $frame_{org}2$) or the scanning line numbers ( line1, line2, . . . ) shown in FIG. 14 are merely illustrative and differ in dependence upon viewing point conversion processing parameters.

By extracting image data on the pixel line basis, as shown in FIG. 12B, from the frame memory 71 having stored therein the data of the original string of parallax images GD, based n the lookup table, it is possible to interchange pixel strings on each scanning line to re-construct and output new viewing point conversion processed images (frame$_{new}$1, frame$_{new}$2, . . . ).

The image re-construction is performed in a timed relation to the recording of the elementary holograms, as discussed above.

Specifically, whilst the shutter for light exposure 32 of the holographic stereogram printer device 3 is opened to record the elementary holograms, a frame-equivalent image data is subjected to viewing point conversion processing to produce re-constructed data which is transiently stored in the frame buffer 77 of the image processing board 65.

After the recording of an elementary hologram comes to a close and the shutter for light exposure 32 is closed, image data saved in the frame buffer 77 is transferred to the display device 41 to update the images displayed on the display device 41. During this time, the recording medium for holograms 30 is fed by one elementary hologram.

When the image displayed on the display device 41 is updated and the recording medium for holograms 30 is fed a distance corresponding to an elementary hologram, the shutter for light exposure 32 is opened to record the elementary hologram.

The above-described operations are repeated a number of times corresponding to the number of images making up the string of parallax images for light exposure GE to formulate the holographic stereogram.

By re-constructing the images in a timed relation to the recording timing of the elementary holograms, the holographic stereogram can be prepared immediately after the end of shooting of the string of parallax images, substantially in rea-time.

Failing the frame buffer 77, viewing point conversion processing is carried out each time one elementary hologram holographic stereogram been recorded and the shutter for light exposure 32 is closed. That is, failing the frame buffer 77, a control signal commanding the image processing board 65 to start the viewing point conversion processing is sent immediately from the control computer 2 to the image processing board 65 to extract pixel-string-based data based n the lookup table. The pixel-string-based data, that is scanning-line-based data, extracted based on the lookup table, is sequentially transferred from the image processing board 65 to the display device 4l. If the frame-equivalent data has been transferred to the display device 41 and the image displayed on the display device 41 is updated, the shutter for light exposure 32 is again opened to permit the recording of the elementary hologram.

The lookup table, stored in the lookup table memory 72 of the image processing board 65, calculates and formulates the relation o correspondence between the pixels of respective images making up the original string of parallax images GD and those making up the string of parallax images for light exposure GE at the outset by a computer.

For preparing the lookup table, the control computer 2 may be used. In this case, a lookup table for the desired viewing point conversion processing is formulated by the control computer 2, from the imaging system for the string of parallax images, imaging parameters, such as imaging distance etc, or parameters at the time of preparation of the holographic stereogram, such as light exposure pitch, by the control computer 2, prior to preparation of the holographic stereogram, and is transferred via board controller 73 to the lookup table memory 72.

Meanwhile, the lookup table memory 72 is preferably constituted by an overwrite memory, such as SRAM. If the overwrite memory is used as the lookup table memory 72, it is possible to re-calculate the relation of correspondence between the pixels of the images making up the original string of parallax images GD and those making up the string of parallax images for light exposure GE to re-formulate the lookup table to update the contents of the lookup table memory 72, in case the relation of correspondence is changed with changes in the imaging system of the string of parallax images, imaging parameters or holographic stereogram formulating parameters.

If the lookup table memory 72 is an overwrite memory, viewing point conversion processing can be effectuated, using a common image processing board 65, subject to updating of the lookup table stored in the lookup table memory 72, even if the type of the imaging system of the string of parallax images, imaging parameters or holographic stereogram formulating parameters are changed. Stated differently, a variety of viewing point conversion processing operations with different parameters can be coped with by formulating the lookup table by the control computer 2 responsive to the desired viewing point conversion processing to update the contents of the lookup table stored in the lookup table memory 72.

Instead of making re-calculations each tine the type of the imaging system of the string of parallax images, imaging parameters or holographic stereogram formulating parameters are changed, it is also possible to formulate a number of lookup tables for coping with various parameters to save the lookup tables in the control computer 2. In this case, the corresponding lookup tables are transferred from the control computer 2 to the lookup table memory 72 each time the parameters are changed to update the contents of the lookup table stored in the lookup table memory 72. This enables quick accommodation to parameter changes.

If, in performing the viewing point conversion processing by interchanging pixels every pixel line on the scanning line, the original string of parallax images GD has the parallax information in the scanning line direction, the parallax converting processing is effectuated after rotating the images of the original string of parallax images GD by 90°.

Specifically, an image rotation processing circuit is arranged between the D1 decoder 64 and the image processing board 65 of the image data generating device 1 for rotating the image by +90°, there is arranged an image rotating processing circuit adapted for rotating the image by −90° between the frame buffer 71 of the image processing board 65 and the I/O controller 75.

Before entering image data to the image processing board 65, the respective images making up the original string of parallax images GD are rotated by +90° by the image rotation circuit. Based on the string of parallax images, thus rotated by +90° by the image rotation processing circuit, the image processing board 65 effectuates viewing point conversion processing thus, even if the original string of parallax images GD sent from the parallax image string imaging system 61 has the parallax information in the scanning line direction, the image processing board 65 interchanges the pixels every pixel line on the scanning line, as in the above-described embodiment, in order to effectuate the viewing point conversion processing.

The image processing board 65 rotates the data of the string of parallax images for light exposure GE, generated on viewing point conversion processing, by −90° by the image rotation processing circuit, and outputs the rotated data via I/O controller 75 to the display device 41. In this manner, the respective images of the string of parallax images for light exposure GE are sequentially displayed on the display device 41, after the orientation of the images of the string of parallax images for light exposure GE is equated to that of the original images shot by the parallax image string imaging system 61.

Figure 15:
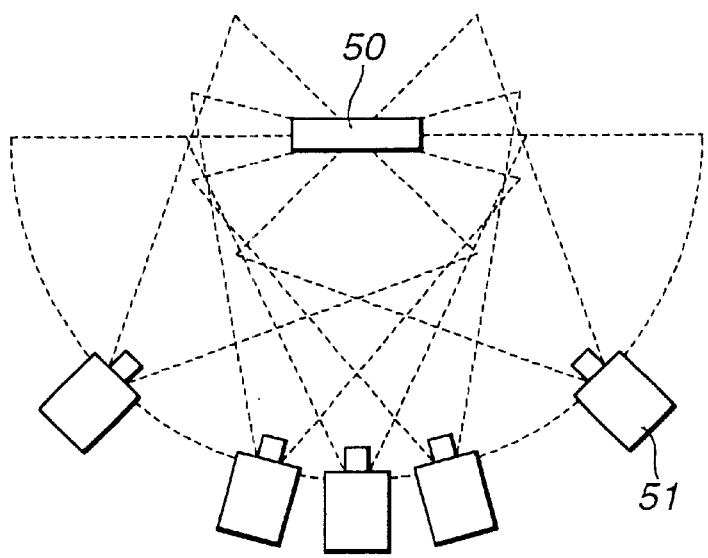
FIG. 15 shows the method for imaging the string of parallax images by imaging an object from different directions by rotating a camera about an object as the center of rotation.

Among the methods for imaging the string of parallax images, there is such a method in which the camera 51 is rotated about the object 50 as the center, as shown in FIG. 15, and the object 50 is imaged from different directions for producing a string of parallax images. Meanwhile, this method is equivalent to the method of imaging the string of parallax images by imaging the object 50 from different directions, with the camera 51 being stationary and with the object 50 being rotated.

Figure 16A:
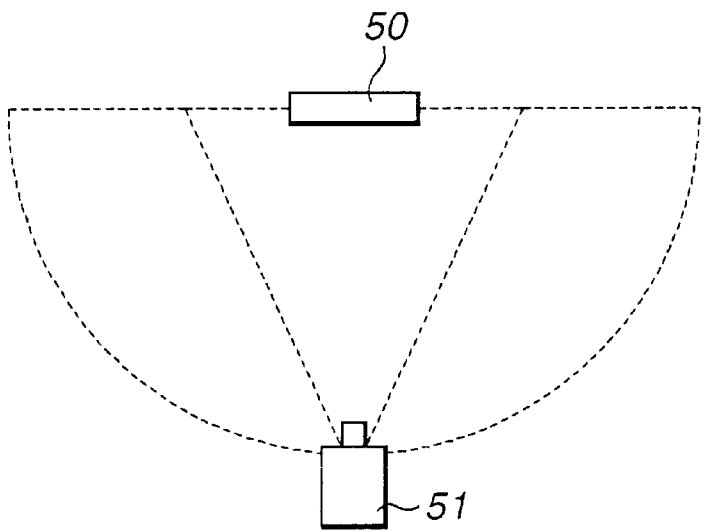
FIG. 16 shows how the string of parallax images is imaged as shown in FIG. 15, with the camera being positioned facing the object, and an image thus produced.
Figure 16B:
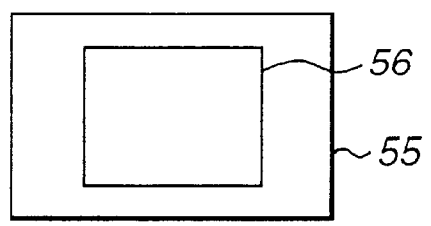
Figure 17A:
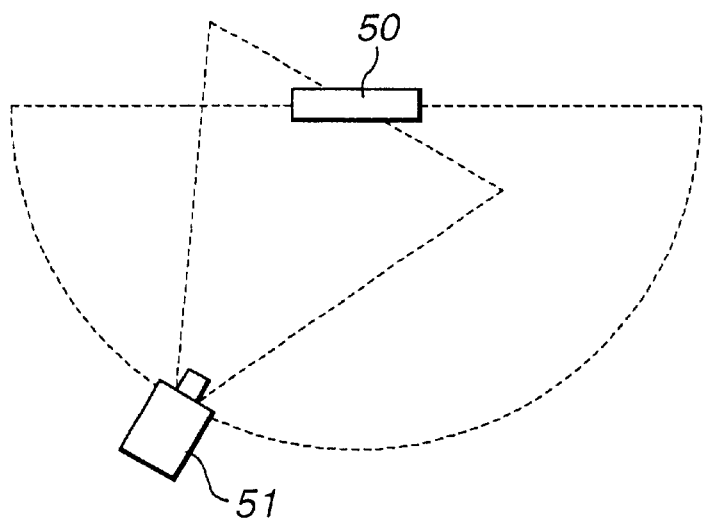
FIG. 17 similarly shows how the string of parallax images is imaged as shown in FIG. 15, with the camera being positioned facing the object, and an image thus produced.
Figure 17B:
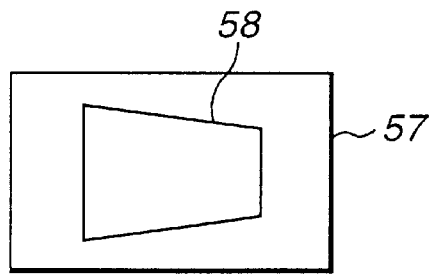
Figure 18:
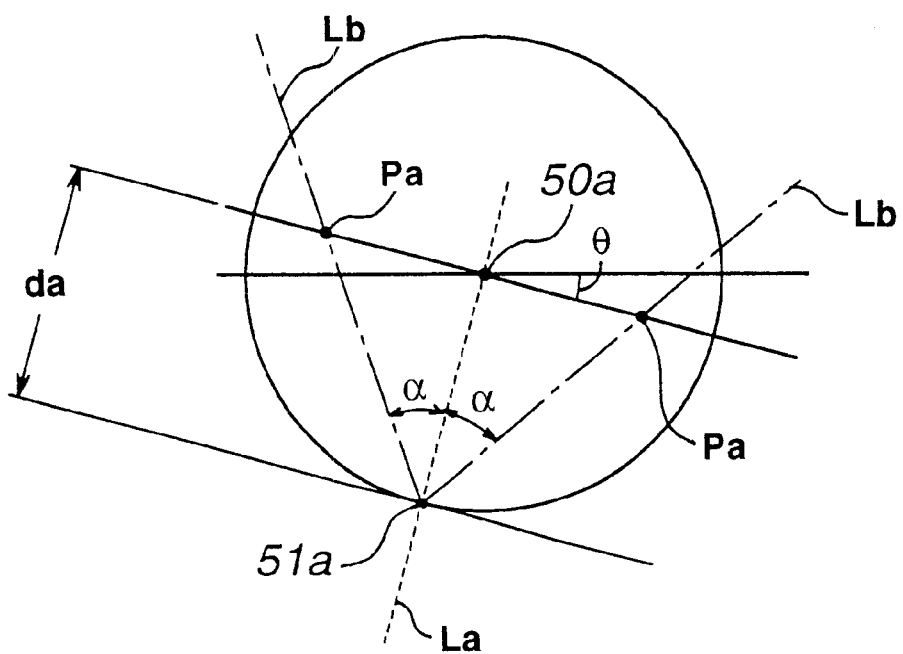
FIG. 18 shows parameters used for correction of the keystone distortion.

If, when the string of parallax images is imaged with the object 50 or the camera kept in rotation, the camera 51 is positioned in front of the object 50, as shown in FIG. 16A, the object 50 is imaged in the as-shot image 55 without distortion. However, if the camera S1 is not positioned in front of the object 50, as shown in FIG. 17A, the as-shot image 57 of an imaged object 58 is distorted, as shown in FIG. 17B.

If the object 50 or the camera 51 is rotated in imaging the string of parallax images, this distortion is desirably corrected at the time of executing the above-described viewing point conversion processing. This distortion is generally termed keystone distortion.

This keystone distortion can be corrected by enlarging or contracting the images in the longitudinal direction every vertical line, that is every pixel column, with a ratio defined by the following equation (2):

$$\text{ratio} = \{d_a/9\cos\alpha + \sin\alpha \cdot \tan\Theta)\}/(d_a/\cos\alpha) = 1 + \tan\alpha \cdot \tan\Theta \ldots \quad (2)$$

where the angle $\Theta$ is the angle of rotation of the object 50 or the camera, with the reference position being the position at which the camera 51 is positioned in front of the object 50, and the distance $d_a$ is the distance between the center of rotation 50$a$ of the object 50 or the camera 51 and the parallax position 51$a$ of the camera 51.

In the above equation (2), if an imaginary line interconnecting the center of rotation 50$a$ of the object 50 or the camera 51 and a viewing point 52$a$ of the camera 51 is denoted as La, and if an imaginary line interconnecting a position Pa of an image enlarged or contracted and a viewing position 51$a$ of the camera 51 is Lb, an angle between the imaginary lines La and Lb is denoted as $\alpha$.

When correcting the keystone distortion, the above ratio is found at the outset every pixel line and the image is enlarged or contracted every pixel line. Specifically, the correction parameters, that is the above ratio, for correcting the keystone distortion, are recorded every pixel column, in addition to the pixel line of each image of the original string of parallax images GD and the pixel line of each image of the string of parallax images for light exposure GE. In effectuating the viewing point conversion processing, pixels are interchanged, based on the lookup table, while the images are enlarged or contracted every pixel line based on the correction parameters contained in the lookup table, in order to correct the keystone distortion simultaneously.

By correcting the keystone distortion in this manner, image data of the string of parallax images, obtained on rotating the object 50 or the camera 51, is equivalent to the image data obtained on translating the camera 51. Thus, if the holographic stereogram is prepared after correcting the keystone distortion in this manner, there is no risk of the image perturbation caused by the keystone distortion.

What is claimed is:

1. An image data processing method in which viewing point conversion processing is performed on a first string of parallax images made up of a plurality of images containing parallax information to generate a second string of parallax images, comprising the steps of:

sequentially storing said first string of parallax images in a memory;

producing a lookup table responsive to the desired viewing point conversion processing giving the relation of correspondence between pixels of said first string of parallax images and those of the second string of parallax images; said lookup table being stored in an overwrite memory;

generating said second string of parallax images from the first string of parallax images by performing said viewing point conversion processing by interchanging pixels based on said lookup table; and recording the second string of parallax images as elementary holograms making up a holographic stereogram.

2. The image data processing method according to claim 1 wherein, if said string of parallax images has parallax only in one direction, the relation of correspondence between pixels of the images making up the first string of parallax images and those making up the second string of parallax images is recorded in said lookup table with a pixel line made up of a line of plural pixels as a minimum unit; and wherein, when effectuating the viewing point conversion processing, pixel interchanging is effectuated with said pixel line as a minimum unit.

3. The image data processing method according to claim 2 wherein said pixel line corresponds to a scanning line for displaying the image on a display device.

4. The image data processing method according to claim 3 wherein, if the first string of parallax images has parallax only in the scanning line direction, said viewing point conversion processing is effectuated on rotating the images making up the string of parallax images by 90°.

5. The image data processing method according to claim 1 wherein correction parameters for correcting keystone distortion are contained in said lookup table in addition to the relation of correspondence between pixels of the images making up the first string of parallax images and those making up the second string of parallax images; and wherein, when effectuating the viewing point conversion processing, pixel interchanging is effectuated based on the lookup table, and wherein the keystone distortion is corrected based on said correction parameters.

6. The image data processing method according to claim 1, wherein data of the string of parallax images subjected to viewing point conversion processing is sequentially outputted in a timed relation to the recording of each elementary hologram in terms of an image of the string of parallax images as a unit.

7. An image data generating apparatus in which viewing point conversion processing is performed on a first string of parallax images made up of a plurality of images containing parallax information to generate a second string of parallax images, comprising:

a memory for sequentially storing said first string of parallax images;

lookup table generating means for generating a lookup table responsive to the desired viewing point conversion processing by finding a corresponding relation between pixels of the first string of parallax images and those of the second string of parallax images;

lookup table storage means for storing said lookup table generated by said lookup table generating means; said lookup table storage means being an overwrite type memory;

generating means for generating said second string of parallax images from the first string of parallax images by performing said viewing point conversion processing by interchanging pixels based on said lookup table stored in said lookup table storage means; and recording means for recording the second string of parallax images as elementary holograms making up a holographic stereogram.

8. The image data generating apparatus according to claim 7 wherein, if said string of parallax images has parallax only in one direction, the relation of correspondence between pixels of the images making up the first string of parallax images and those making up the second string of parallax images is recorded in said lookup table, with a pixel line made up of a line of plural pixels as a minimum unit and wherein, when carrying out the viewing point conversion processing, pixel interchanging is effectuated with said pixel line as a minimum unit.

9. The image data processing apparatus according to claim 8 wherein said pixel line corresponds to a scanning line for displaying the image on a display device.

10. The image data processing apparatus according to claim 9 wherein, if the first string of parallax images has parallax only in the scanning line direction, said viewing point conversion processing is effectuated on rotating the images making up the string of parallax images by 90°.

11. The image data processing apparatus according to claim 7 wherein correction parameters for correcting keystone distortion are contained in said lookup table and wherein, when carrying out the viewing point conversion processing, pixel interchanging is effectuated based on the lookup table, while the keystone distortion is corrected based on said correction parameters.

12. The image data processing apparatus according to claim 7, wherein data of the string of parallax images subjected to viewing point conversion processing is sequentially outputted in a timed relation to the recording of each elementary hologram in terms of an image of the string of parallax images as a unit.

* * * * *